United States Patent Office 3,446,894
Patented May 27, 1969

3,446,894
STABILIZATION OF VITAMIN C TABLETS
Louis Magid, Clifton, N.J., assignor to Hoffman-La Roche Inc., Nutley, N.J., a corporation of New Jersey
No Drawing. Filed Sept. 15, 1966, Ser. No. 579,481
Int. Cl. A61k 15/12
U.S. Cl. 424—176
9 Claims This invention is concerned with vitamin C tablets which are stabilized against discoloration. More particularly, this invention is concerned with the use of certain sugars as stabilizers for high potency vitamin C tablets.

It has long been known that vitamin tablets containing vitamin C are susceptible to discoloration on storage, especially at elevated temperatures. This tendency toward discoloration has assumed special importance due to the recent interest in producing a high potency vitamin C tablet, i.e., a tablet containing vitamin C in an amount of at least 70 percent and preferably at least 85 percent as the sole active ingredient. In producing tablets of this nature it was discovered that granulations and tablets containing such high concentrations of vitamin C and having starch as the principal excipient and/or pregelatinized starch as the principal binder, i.e., wherein the combined weight of starch and pregelatinized starch comprises at least 50 percent, and especially at least 75 percent, of the balance of the composition, the granulations and tablets are very susceptible to discoloration on storage, especially when stored at elevated temperatures. By the term "starch," as employed herein, is meant the conventional forms of starch, such as cornstarch, potato starch, and the like, as well as pre-gelatinized forms sold under such trade names as "OK Pre-gel" (Hubinger Co.), "Instant Cleargel," "Instant Gel," and "Amijel" (all by National Starch and Chemical Corporation), and the like.

It has now been found in accordance with this invention that sorbose or lactose or a mixture thereof inhibit discoloration in compositions of this nature. The discoloration-inhibiting or stabilizing amount is not narrowly critical in these compositions, although it should be at least 0.2 weight percent based upon the weight of vitamin C. The preferred stabilizing amount is at least about 1 weight percent. Obviously higher amounts can be employed if desired, but generally no advantage is realized by employing amounts of greater than about 5 weight percent based upon vitamin C. In addition, the amount should comprise less than 50 percent of the weight of the composition exclusive of vitamin C, for if present in an amount of greater than 50 percent, the sorbose, lactose, or mixture thereof would constitute an excipient rather than the stabilizer as contemplated by this invention.

In addition to vitamin C, starch, and the sorbose, lactose, or mixture thereof, the compositions of this invention can contain other excipients, binders, or coloring agents, flavoring agents, and the like.

The following examples are illustrative.

Example 1

A mixture (Mixture A) of powdered vitamin C, cornstarch, and pregelatinized starch ("Amijel") was granulated with water, dried at 45° C., and then passed through a 12-mesh (U.S. series) screen. The resulting granulation was admixed with a mixture (Mixture B) of stearic acid, talc, and cornstarch, and the resulting granulation was compressed into tablets. Two additional formulations were made containing either sorbose or lactose. Granulations and tablets of each formulation were then evaluated for color stability by storing for one year at room temperature or for 3 months at 45° C. The formulations and results of these stability tests are summarized in Table I:

TABLE I

| Component, weight in milligrams | Sample No. | | |
|---|---|---|---|
| | 1 | 2 | 3 |
| Mixture A: | | | |
| Vitamin C | 510 | 510 | 510 |
| Sorbose | | | 50 |
| Lactose | | 50 | |
| Cornstarch | | 70 | |
| "AMIJEL" | 100 | 30 | 50 |
| Mixture B: | 50 | 50 | 50 |
| Stearic acid | 8 | 8 | 8 |
| Talc | 8 | 8 | 8 |
| Cornstarch | 10 | 10 | 10 |
| Appearance (tablets and granulation): | | | |
| 3 months/45° C | (1) | White | (2) |
| 1 year/room temperature | (3) | White | White |

[1] Off-white.
[2] Slightly off-white.
[3] Slightly dark.

Example 2

Employing techniques similar to those described in Example 1, several additional granulations and tablets were produced containing varying amounts of lactose. The formulations and evaluation of the resulting granulations and tablets are summarized in Table II:

TABLE II

| Component, weight in milligrams | Sample No. | | | | |
|---|---|---|---|---|---|
| | 1 | 2 | 3 | 4 | 5 |
| Mixture A: | | | | | |
| Vitamin C | 500 | 500 | 500 | 500 | 500 |
| "AMIJEL" | 50 | 40 | 40 | 40 | 25 |
| Lactose | | | 5 | 10 | 25 |
| Cornstarch | | 10 | 5 | | |
| Mixture B: | | | | | |
| Calcium stearate | 5 | 5 | 5 | 5 | 5 |
| Cornstarch | 15 | 15 | 15 | 15 | 15 |
| Appearance (tablets and granulations) | | | | | |
| 3 months/45° C | (1) | (1) | White | White | White |
| 6 months/room temperature | (2) | (2) | White | White | White |

[1] Off-white.
[2] Off-white (slightly dark).

I claim:
1. A solid vitamin tablet granulation consisting of (1) vitamin C as the sole active component in an amount of at least 70 weight percent, (2) starch as the principal excipient and binder in an amount of at least 50 weight percent of the balance of the composition, and (3) sorbose, lactose, or a mixture thereof in an amount, of from at least about 0.2 weight percent to not more than about 5 weight percent, based upon the weight of vitamin C, sufficient to stabilize the composition against discoloration.

2. The composition as claimed in claim 1 wherein sorbose is the stabilizer.

3. The composition is claimed in claim 1 wherein lactose is the stabilizer.

4. The composition as claimed in claim 1 wherein (1) vitamin C is present in an amount of at least 85 weight percent, (2) starch is present in an amount of at least 75 weight percent of the balance of the composition, and (3) sorbose, lactose, or a mixture thereof is present in an amount of at least 0.2 weight percent based upon the weight of vitamin C.

5. A composition as claimed in claim 4 wherein sorbose is the stabilizer.

6. The composition as claimed in claim 4 wherein lactose is the stabilizer.

7. A composition as claimed in claim 4 wherein said stabilizing amount is at least 1 weight percent based on the weight of vitamin C.

8. A composition as claimed in claim 5 wherein said stabilizing amount is at least 1 weight percent based on the weight of vitamin C.

9. A composition as claimed in claim 6 wherein said stabilizing amount is at least 1 weight percent based on the weight of vitamin C.

References Cited

UNITED STATES PATENTS

| | | | |
|---|---|---|---|
| 2,887,437 | 5/1959 | Klioze et al. | 424—361 X |
| 3,138,532 | 6/1964 | Aiello et al. | 424—280 X |
| 3,175,948 | 3/1965 | Koff et al. | 424—361 X |
| 3,293,132 | 12/1966 | Stoyle et al. | 424—361 X |

OTHER REFERENCES

Chem. Abstracts 43: 1016 i-1017a (1949).
Chem. Abstracts 44: 8555 e-8557a (1950).

LEWIS GOTTS, *Primary Examiner.*

S. K. ROSE, *Assistant Examiner.*

U.S. Cl. X.R.

424—14, 280, 361

UNITED STATES PATENT OFFICE
CERTIFICATE OF CORRECTION

Patent No. 3,446,894                                    May 27, 1969

Louis Magid

It is certified that error appears in the above identified patent and that said Letters Patent are hereby corrected as shown below:

Column 1, lines 33 to 35, "Instant Gel", and "Amijel" (all by National Starch and Chemical Corporation)," should read -- "Instant Gel", (all by National Starch and Chemical Corporation), and "Amijel" (Corn Products Co.) -- Column 2, line 48, after "granulation" insert -- composition --; line 59, "is" should read -- as --.

Signed and sealed this 14th day of April 1970.

(SEAL)
Attest:

Edward M. Fletcher, Jr.                           WILLIAM E. SCHUYLER, JR.
Attesting Officer                                      Commissioner of Patents